United States Patent Office.

FREDRICK REIMERS, OF OTTUMWA, IOWA.

MANUFACTURE OF ARTIFICIAL STONE.

SPECIFICATION forming part of Letters Patent No. 348,415, dated August 31, 1886.

Application filed February 10, 1886. Serial No. 191,504. (Specimens.)

*To all whom it may concern:*

Be it known that I, FREDRICK REIMERS, a citizen of the United States, residing at Ottumwa, in the county of Wapello and State of Iowa, have invented certain new and useful Improvements in the Manufacture of Artificial Stone and Marble; and I hereby declare the following to be a full, clear, and exact description thereof.

My invention relates to certain improvements in the manufacture of artificial stone and marble for building and paving purposes, inside and outside finish of buildings, and decorative work of various descriptions in imitation of different varieties of natural stone and marble; and to this end my invention consists in a composition formed of certain ingredients combined and chemically treated in such a manner as to produce a strong, hard, and durable article of artificial stone or marble which is capable of receiving a high polish and will successfully resist the action of fire, frost, and water, thus rendering it especially well adapted for use as a building material in any climate, and for an infinite variety of other purposes, as hereinafter set forth.

In carrying my invention into effect I take a suitable receptacle and place therein one hundred gallons of water, and add thereto ten gallons of "bittern-water," (which is the brine remaining in salt-works after the salt is concreted,) two pounds of caoutchouc dissolved in naphtha, five pounds of carbonate of soda, six pounds of gum-arabic, four pounds of magnesia, four pounds of chloride of zinc, and four quarts of oxide of iron. These ingredients are then thoroughly and intimately mixed and incorporated together by stirring, forming my dampening solution, which, when used, is diluted by adding to each two quarts, more or less, about thirty gallons of water.

To make artificial stone I take Portland or other suitable cement and thoroughly mix the same with fine sharp sand or gravel, or both, in any desired proportions, in accordance with the nature of the work, and then dampen this mixture with a sufficient quantity of the above-described diluted chemical solution until the mass has the desired consistency, after which it is tamped or pressed into molds of any desired form or shape in the ordinary well-known manner. After the stone is removed from the mold it should be dampened from time to time with the diluted solution above described for three or four days, when it will be ready for use.

In the manufacture of artificial marble I take the best fine-ground gypsum, instead of the cement and sand or gravel before described, and mix the same with my above-described diluted chemical solution to the consistence of thick paste, and then place the same in molds previously greased and placed on a smooth surface, and allow it to remain until hard and dry, when it can be removed and polished in the same manner as natural marble.

The above-described stone or marble composition may be made of any color desired by mixing therewith the necessary pigments in the usual manner.

To produce variegated marble, I mix in separate bowls or receptacles suitable quantities of the before-described marble composition of the different colors required, and when the same has the consistence of thick and stiff dough I roll it into small balls from the size of an apple-seed to that of an egg, and while still in a plastic state I take a quantity of these balls of different sizes and colors and pack them close together until they become blended into a solid mass, which I cut with a long sharp knife into slices of about one-quarter of an inch thick, which are then applied in a zigzag manner to the sides and bottom of the mold until the same are entirely covered. I then take a damp cloth and lay over the surface of the material and tamp the same well down, in order to exhaust or remove therefrom all the air that is possible. I next mix one part of Portland cement and one part of fine sand with a suitable quantity of my before-described diluted chemical solution to render it plastic, and fill the mold with the same to a level with the top, after which it is left to dry. When it is removed from the mold, I fill in any crevices or cracks that may be found with the plastic marble composition before described, and after becoming dry the surface is polished in the same manner as marble. Should it be desired to produce the effect of veins in the marble, the balls of different colors are rolled out and the outer surface of each one covered with the color desired for the veins. These pieces are then all placed together side by side and the mass cut into slices, when the veins will plainly appear upon the surface. In most cases one part of cement to eight parts of sand and gravel will be all that is required, unless a very fine finish is needed, to make which I use one part of cement and two parts of fine sand, which will produce a very smooth and even surface.

The above-described chemical solution produces a perfect crystallization of the stone or marble compound, which is thus petrified and rendered extremely hard and durable, the particles being thereby caused to adhere so closely and tenaciously together as to render the material when dry fire-proof, and effectually prevent the entrance of air or the absorption of moisture and the consequent injury or destruction of the material by frost if exposed to low temperatures. Sidewalks, monuments and other cemetery work of all descriptions, building-blocks, and an infinite variety of other articles employed for the interior and exterior decoration of buildings in imitation of natural stone and marble can be easily and cheaply produced by the employment of suitable molds, and an immense saving in time and labor thus effected.

In laying sidewalks composed of my improved compound I prefer to provide the surface of the same with a series of recesses or perforations at short distances apart, in order to secure a better foothold in slippery weather. These perforations can be arranged in diamonds, squares, or other ornamental forms, and may be produced in any suitable manner—for instance, by a series of pins projecting from a board or frame and adapted to pass through corresponding holes in a clearer or plate, which is laid on the surface of the work and prevents the same from being disturbed or raised around the holes on the withdrawal of the pins.

What I claim as my invention, and desire to secure by Letters Patent, is—

1. An artificial stone or marble composed of sand or gravel and cement, or of pulverized gypsum, united and solidified by mixing therewith a chemical solution formed of water, bittern-water, caoutchouc dissolved in naphtha, carbonate of soda, gum-arabic, magnesia, chloride of zinc, and oxide of iron, substantially as and for the purpose set forth.

2. The herein-described liquid compound, consisting of water, bittern-water, caoutchouc dissolved in naphtha, carbonate of soda, gum-arabic, magnesia, chloride of zinc, and oxide of iron, substantially in the proportions named, for the purpose of producing the crystallization of the artificial stone or marble, as described.

3. The herein-described method of producing variegated artificial marble, the same consisting in pressing and blending together into a solid mass balls of different colors and sizes formed of the marble composition, then cutting the mass so produced into slices and laying the same in zigzag form against the bottom and sides of the mold, and then filling up the inside of the latter, substantially as set forth.

Witness my hand this 6th day of February, A. D. 1886.

FREDRICK REIMERS.

In presence of—
 A. P. BARTON,
 TH. J. THORNHILL.